United States Patent [19]

Schiebelhuth

[11] Patent Number: 4,994,641

[45] Date of Patent: Feb. 19, 1991

[54] BEVERAGE BREWER WITH AN ELECTRIC FLOW-THROUGH HEATER OPERABLE IN TWO POWER STEPS

[75] Inventor: Heinz Schiebelhuth, Frankfurt, Fed. Rep. of Germany

[73] Assignee: Braun Aktiengesellschaft, Fed. Rep. of Germany

[21] Appl. No.: 400,168

[22] Filed: Aug. 29, 1989

[30] Foreign Application Priority Data

Sep. 9, 1988 [DE] Fed. Rep. of Germany ....... 3830633

[51] Int. Cl.⁵ ............................................. F24H 1/10
[52] U.S. Cl. .................................. 219/308; 219/282
[58] Field of Search ............................... 219/280–283, 219/297, 306–312, 319, 320, 323, 324, 328, 335, 343, 364, 506, 507

[56] References Cited

U.S. PATENT DOCUMENTS

| | | | |
|---|---|---|---|
| 3,430,232 | 2/1969 | Martin | 219/282 |
| 4,758,709 | 7/1988 | Schiebelhuth . | |
| 4,827,837 | 5/1989 | Johnson et al. | 219/308 |
| 4,838,152 | 6/1989 | Kubicko et al. | 219/308 |

FOREIGN PATENT DOCUMENTS 7809444 8/1978 Fed. Rep. of Germany .
2839140 3/1980 Fed. Rep. of Germany .

*Primary Examiner*—Bruce A. Reynolds
*Assistant Examiner*—Tu Hoang
*Attorney, Agent, or Firm*—Fish & Richardson

[57] ABSTRACT

A beverage brewer has an electric flow-through heater operable in two power steps. In a first embodiment of the invention, the first and second pilot lamp (15 and 18, respectively) light up when the flow-through heater is operated at its upper and respectively, lower power step, while in a second embodiment of the invention, the first pilot lamp (15) indicates the ON condition of the flow-through heater and the second pilot lamp (18) lights up when it is operated at its lower power step. Both embodiments have in common that the second lead (20) of the second pilot lamp (18) is dead-ended when the second switch (12) is open, and is not connected to the secondary conductor (11) until the second switch (12) closes.

12 Claims, 2 Drawing Sheets

BEVERAGE BREWER WITH AN ELECTRIC FLOW-THROUGH HEATER OPERABLE IN TWO POWER STEPS

This invention relates to a beverage brewer.

BACKGROUND OF THE INVENTION

Beverage brewers of this type which serve in particular the function of making filter coffee are known from the Programmübersicht Frühjahr '88 (Spring 88 Product Overview) of the Braun AG of Rüsselsheimer Str. 22, 6000 Frankfurt/Main (Date of Issue: April 1988), being listed on page 32 of this publication under Model Nos. KF 45, KF 65 and KF 75.

Coffee makers of this type of construction are in general use nowadays. Their basic structure and their mode of function are described, for example, in DE-U-78 09 444. They comprise a cold water reservoir from which water is initially conducted to a flow-through heater which includes an electrical heating resistor. In this heater, the water is heated to the brewing temperature and subsequently delivered through a riser to a filter cone containing the coffee grinds from which the coffee then flows to an underlying insulated carafe. To maintain the coffee at the desired higher drinking temperature during brewing and also thereafter, the coffee carafe rests on a warming plate which is likewise heated by the heating resistor of the flow-through heater. To enable the heating resistor to serve the dual function of heating the water and keeping the brewed coffee hot within a predetermined temperature range, it is turned off by a temperature-controlled regulator which is thermally coupled to the flow-through heater, generally a bimetallic control element, when its temperature exceeds a predetermined maximum value, being turned on again when its temperature falls below a predetermined minimum value.

The types of coffee maker referred to are equipped with two switches having two switch positions each, the first switch being the "main switch" which, depending on its position, serves to connect or disconnect the coffee maker to or from its electrical supply. The second switch which is referred to as the "mini-brew switch" is switched to its ON position when the user of the coffee maker wishes to brew only small batches of coffee. For this purpose, an electrical circuitry may be used as known from either FIG. 4 of DE-OS 2,839,140 or FIG. 1 of EP-A1-0 186 097.

The circuitry known from DE-OS 2,839,140 operates according to the following principle: With the first switch open, closing of the second switch causes a diode to be connected in the circuit for the voltage supply of the heating resistor between the heating resistor and the source of AC power, so that the heating resistor operates only in the half-wave mode, accordingly delivering only half its rated power. As a result, both the duration of the brewing cycle is extended and the warming plate is heated with less heating power on completion of the brewing cycle. In this manner, the aroma of the coffee grinds is fully utilized also when brewing small batches of coffee because of the prolonged brewing cycle and, in addition, the coffee is kept warm after brewing in a manner preserving its aroma.

In the circuitry known from EP-A1-0 186 097, both the first and second switch have to be closed for brewing small batches. In this arrangement, the regulator which is thermally coupled to the heating resistor is heated by a supplementary heating device when the regulator has opened due to the increase in its temperature, thereby closing again at a moment later than it would do in the absence of the supplementary heating device. This prolongs the intervals during which the power output of the heating resistor is practically zero.

Irrespective of whether the types of coffee maker identified in the foregoing employ the circuitry known from EP-A1-0 186 097 or DE-OS 2,839,140 or another circuitry in which the half-wave mode equally causes the power output from the heating resistor to be halved, the first switch includes a pilot lamp lighting up when the switch is in its ON position. A second pilot lamp capable of indicating the switch position of the mini-brew switch has not been provided so far.

The reason for this is that in all circuitry variants of prior art devices a decoupling of the indicator statuses of the two lamps in dependence on the position of the two switches could only be accomplished by the use of additional "decoupling diodes". In addition to the higher cost incurred by the components themselves, the mounting of further diodes also results in increased manufacturing cost for the corresponding circuits, whereby substantial disadvantages are entailed.

SUMMARY OF THE INVENTION

It was, therefore, an object of the present invention to provide for both circuit variants a pilot lamp also for the second switch referred to as mini-brew switch, this lamp lighting up only when this switch is closed for brewing small batches of coffee, with the necessity of using further diodes or other current-inhibiting components being obviated.

Both embodiments of the invention have as common feature that a decoupling of the indicator statuses of the two pilot lamps is accomplished already in that the second lead of the respective pilot lamp is dead-ended in the open condition of the switch associated therewith, and is not connected to the associated electric conductor (main or secondary conductor) until the switch closes.

Accordingly, the two pilot lamps in the circuitry of the invention reflect the respective condition of the associated switch, without the need to use additional diodes for decoupling the indicator statuses of the two pilot lamps. This means that only the first pilot lamp lights up when the first switch is closed, and only the second pilot lamp lights up when the second switch is closed.

In addition to the advantage afforded by the elimination of two diodes and the savings of material and manufacturing cost thereby realized, the two switches may be commercially available standard switches having two contact surfaces which are extended by an additional contact. The respective switch can be configured with particular simplicity if first the second lead of the respective pilot lamp is connected to the secondary and, respectively, main conductor, before both are connected to the second terminal of the power source.

In an advantageous improvement of the invention, the secondary conductor is connected to the second contact surface and the second terminal of the power source is connected to the first contact surface of the second switch, the two contact surfaces are adapted to be connected by the movement of an electrically conducting contact member, and the additional contact is comprised of a contact spring electrically connected to the second lead of the second pilot lamp, which spring extends into the range of motion of the contact member and which resiliently engages the contact member on movement of the contact member in the closing direction of the second switch before the contact member establishes contact between the first and the second contact surface. Because the additional contact, being a single component, can be easily integrated into the switch, it is possible to use standard switches sold on the market, with only a minor modification being required. This arrangement provides a particularly simple way of using switches with an indicator light in coffee makers or other domestic appliances while obviating the provision of additional diodes, the additional indicator light thus avoiding faulty operation of otherwise nonilluminated switches on domestic appliances, that is, the indicator light always provides an indication to the user of whether the mini-brew switch on the coffee maker is turned on or off. The contact face of the contact spring which is adapted to be connected to the bridging contact member of the switch extends into the contact travel to such an extent that first the contact spring contacts the contact member before the contact member short-circuits the switch.

To maintain the contact spring invariably in the same position relative to the contact member also after numerous switching operations, the contact spring is fixedly located in the housing of the second switch and connected to the second lead of the second pilot lamp. The standard switch used requires only a mounting arrangement for the contact spring and an additional connection to the pilot lamp, which can be readily accomplished without altering the switch in principle.

The switch becomes particularly simple if the contact spring is fastened to the contact terminal provided in the second switch and adapted to be connected to the second lead, if for this purpose the contact terminal of the second switch has an opening, if an electrically insulating, rubber-elastic plug member is mounted in the opening, and if the plug member includes a bore in which the contact spring is secured. The contact terminal which exists anyway for supplying energy to the pilot lamp is only provided with a bore which is engaged by a plug member connected to the contact spring. The contact spring is subsequently connected to the second lead in current-conducting fashion.

To avoid additional fastening means between the contact terminal, the plug member and the contact spring, the contact spring is mounted in the plug member made of a rubber-elastic material by frictional engagement therewith.

It will be a particular advantage if the second switch is a rocker switch because it is particularly simple in construction and accordingly can be manufactured at low cost. Because of the difficulty of recognizing the ON or OFF state of rocker switches having no indicator light, the arrangement of the invention is especially suitable for this embodiment.

In addition, it will be an advantage to use a diode for the power-reducing switching element of the circuitry of the invention because it is relatively inexpensive and has low space requirements, while its ohmic power input is negligibly small.

The advantages referred to in respect of economy of material and manufacture can also be realized in the circuitry of the invention, in which the indicator status of the two pilot lamps is equally decoupled from the switch position of the switch not associated with the respective lamp. When the first switch is in the ON position, only the first pilot lamp will light up, both pilot lamps going on only when both the first and the second switch are closed. In the event that only the second switch is closed, neither pilot lamp goes on.

Moreover, this circuitry has the advantage that only one of the two commercially available switches, that is, the second switch, has to be configured in accordance with the invention, which switch may be advantageously provided with an additional contact, which reduces the manufacturing and material cost still further.

Finally, it will be advantageous in view of the long life and the low current consumption to use glow lamps or light-emitting diodes for the pilot lamps.

BRIEF DESCRIPTION OF THE DRAWINGS

The invention will be described in more detail in the following with reference to two embodiments. In the accompanying drawings.

DESCRIPTION OF PARTICULAR EMBODIMENTS

Figure 1:
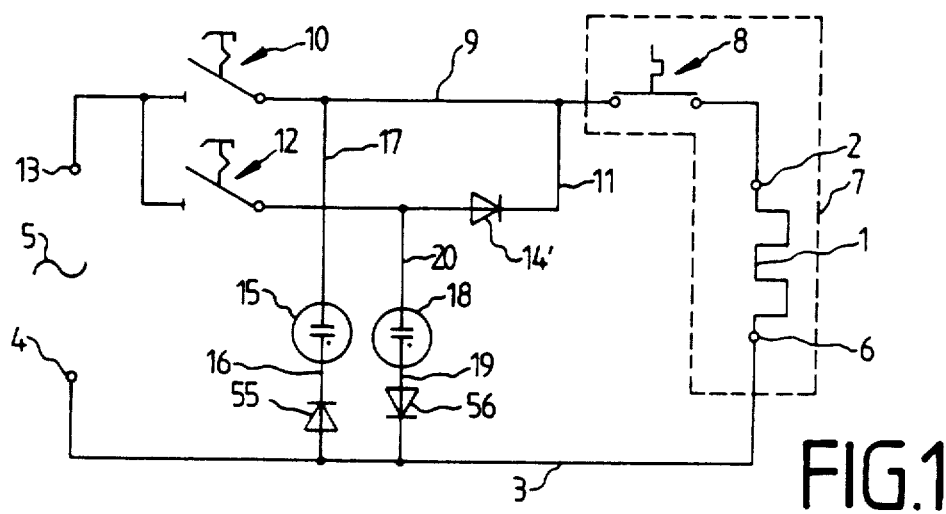
FIG. 1 is a schematic of the prior art circuitry operating according to the principle indicated in DE-OS 2,839,140 for the mini-brew mode and including two pilot lamps which are decoupled by means known from the prior art.

Referring now to FIG. 1, there is shown a heating resistor 1 which has a first electrical lead 6 and a second electrical lead 2 and is in thermal contact with a flow-through heater 7 shown only schematically and a temperature-controlled regulator 8, in addition to being in thermal contact with a warming plate not shown. The first lead 6 of the heating resistor 1 is directly connected to the first terminal 4 of a source of AC power 5 via a first electric conductor 3. The second lead 2 of the heating resistor 1 is connected to the first lead of the regulator 8. The other lead of the regulator 8 is connected to the second terminal 13 of the source of AC power 5 via a main conductor 9 and a first switch 10, as well as via a secondary conductor 11 connected in parallel therewith and including a diode 14' and a second switch 12. In this arrangement, the second switch 12 serves the function of a mini-brew switch as initially described.

Connected in series between the main conductor 9 and the first electric conductor 3 are a first pilot lamp 15 with its first lead 16 and its second lead 17, followed by a diode 55. In the same manner, a second pilot lamp 18 with its first and second leads 19 and 20, respectively, and a further diode 56 are serially connected in the secondary conductor 11 between the second switch 12 and the diode 14' on the one side and the first electric conductor 3 on the other side.

In contrast to the circuitry known from DE-OS 2,839,140, this circuitry includes an additional pilot lamp. The two diodes 55, 56 serve to decouple the indicator statuses of the two pilot lamps 15, 18 from the switch position of the switch with which the respective lamp is not associated. Only by using the two diodes 55, 56 is it possible for the first pilot lamp 15 to reflect the switch position of the first switch 10 and for the second pilot lamp 18 to reflect the position of the second switch 12. In the event of the diode 14' being conducting (positive half wave at the second terminal 13 of the source of AC power 5), with the diode 55 omitted and with the first switch 10 open and the second switch 12 closed, also the first pilot lamp 15 would be connected to AC power and consequently light up. Equally, with the diode 56 omitted and with the first switch 10 closed and the second switch 12 open, the second pilot lamp 18 would likewise light up in the event that the phase of the source of AC power resides at the terminal 4 and a negative half wave is present.

Figure 2:
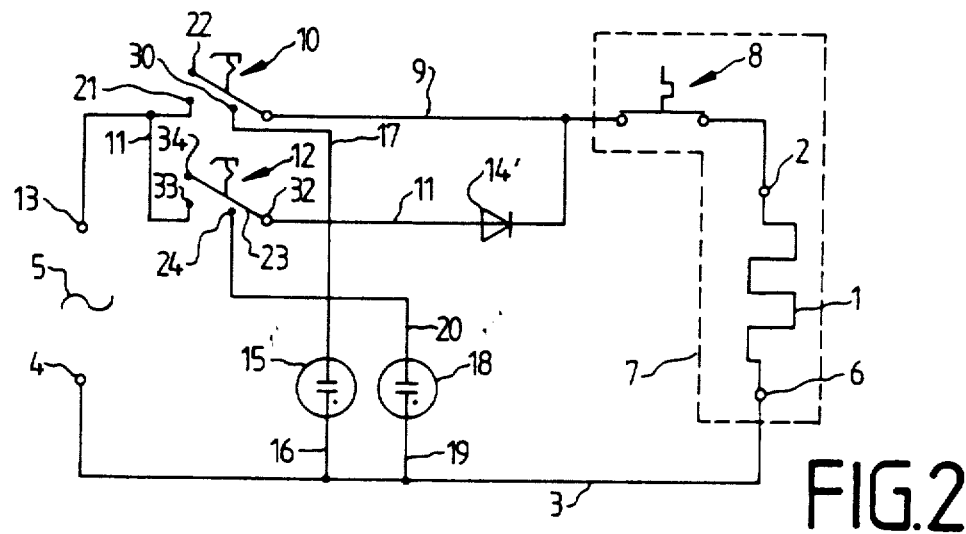
FIG. 2 is a schematic of prior art circuitry of the invention operating according to the principle.

The circuitry shown in FIG. 2 corresponding largely to the circuitry shown in FIG. 1, like parts have been assigned like reference numerals. The essential difference of the circuitry shown in FIG. 2 as compared with the circuitry shown in FIG. 1 consists in that the two diodes 55, 56 of FIG. 1 are omitted, and that the two second leads 17 and 20 of the first 15 and, respectively, second pilot lamp 18 are not permanently connected to the main conductor 9 and, respectively, the secondary conductor 11, but are connected thereto not until after closing of the first and second switch 10 and 12, respectively.

Figure 3:
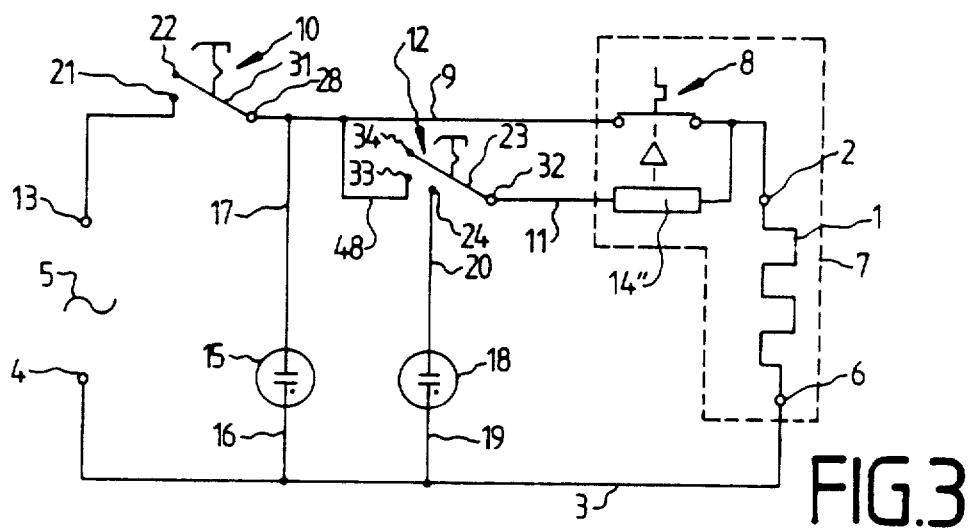
FIG. 3 is a schematic of a second embodiment of circuitry of the invention operating according to the principle indicated in EP-A1-0 186 097.

Also in the circuitry shown in FIG. 3 which relates to the second embodiment of the invention, components corresponding to components shown in FIG. 1 have been assigned like reference numerals. The mini-brew mode functions such that, with the first and second switch 10 and 12, respectively, closed and the brewing cycle completed, the heating output of the heating resistor 1 becomes practically zero when the temperature-responsive regulator 8 has opened, because a supplementary heating device 14" placed in series therewith has a substantially higher resistance.

When the regulator closes again because the warming plate or the flow-through heater 7 have cooled down, the secondary conductor 11 is again by-passed causing the full AC voltage to be applied again to the heating resistor 1 which accordingly delivers again the full heating power. The time span after which the regulator 8 thermally coupled to the supplementary heating device 14" closes again is extended by the flow of heat emitted from the supplementary heating device 14". As a result, the warming plate, on completion of the brewing cycle, is less heated on the time average, so that small batches of coffee are kept warm in a manner preserving its aroma.

In this circuitry, too, the second lead 20 of the second pilot lamp 18 is not connected to the secondary conductor 11 until the second switch 12 closes. In consequence, the second pilot lamp 18 and the first pilot lamp 15 can only go on if the associated second switch 12 and, respectively, first switch 10 is closed. With the first switch 10 closed and the second switch 12 open, a switch position which is used for preparing normal quantities of coffee, only the first pilot lamp 15 lights up. If the second switch 12 is closed while the first switch 10 is open, neither pilot lamp lights up because in this switch position the coffee maker operates neither in the mini-brew mode nor in the normal brewing mode.

In the circuitry shown in FIG. 3, standard switches can be used for both the first switch 10 and the second switch 12, with the first switch 10 requiring no modifications, while the second switch 12 merely requires the provision of an additional contact.

Figure 4:
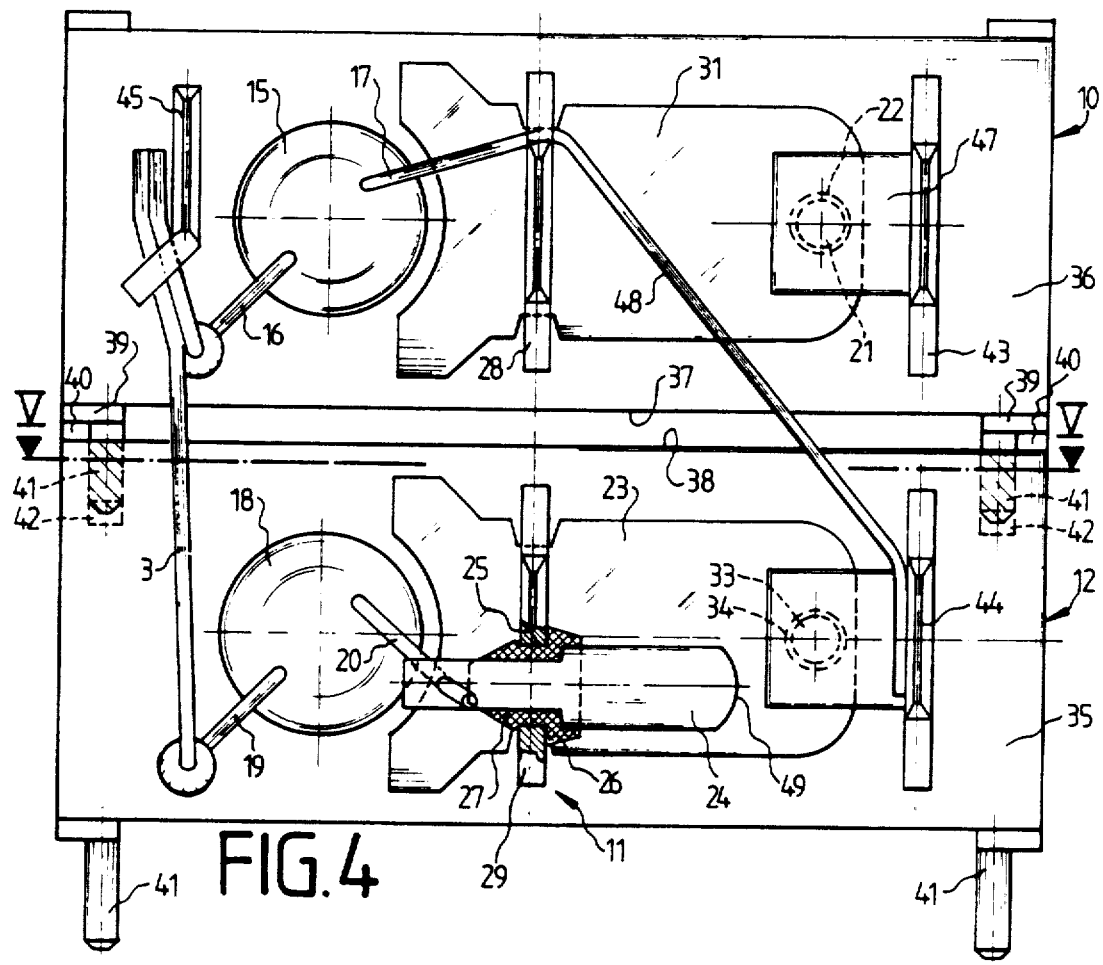
FIG. 4 is a top plan view into the interior, taken along the direction of the arrow X of FIG. 5, on an arrangement of two switches suitable for a circuitry according to FIG. 3.
Figure 5:
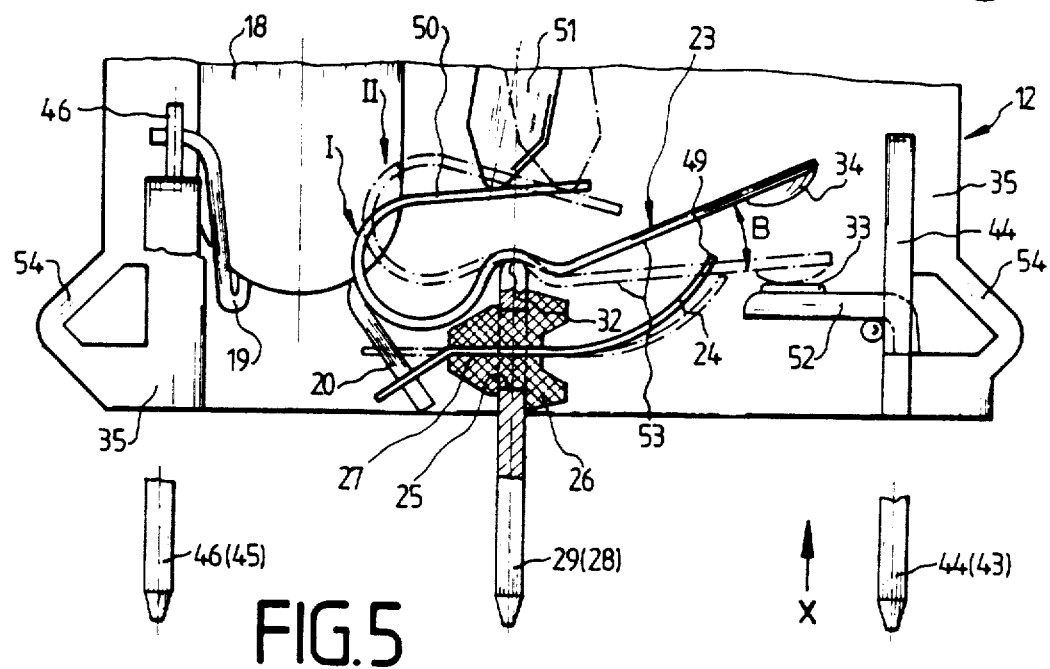
FIG. 5 is a sectional view through the second switch, taken along the line V—V of FIG. 4.

FIGS. 4 and 5 illustrate an embodiment for an arrangement of the two switches 10 and 12 suited for an electrical circuitry according to FIG. 3.

FIG. 4 shows a bottom view of the housing 35 of the switch 12 and of the housing 36 of the switch 10. Both switches 10, 12 have at either end of their respective sides 37, 38 facing each other respective projections 39, 40 for relative abutting engagement of the switches 10, 12, the switches being in relative positive engagement by means of pegs 41 formed, for example, on the projections 39 of switch 10, the pegs being frictionally engaged in bores 42 provided on the second switch 12. In this manner, a plurality of switches can be plugged into each other by simple means. The switches 10, 12 have each three respective contact terminals 45, 46; 28, 29 and 43, 44 extending parallel to one another and projecting downwardly out of their respective housings 35, 36 (FIG. 5).

Contact terminal 43 which is connected to the first contact surface 21 through the transversely extending strut member 47 establishes the connection to the second terminal 13. Contact terminal 28 establishes the connection to the main conductor 9. Exactly as illustrated in FIG. 5, a leg spring 31 configured as a rocker bears with its free end against the contact terminal 28 in the housing, the leg spring being identical with the contact member 23 of FIG. 5. The rocker 31 has at its free end the second contact surface 22 which is spaced a small distance from the first contact surface 21 in the open position of the switch 10. To the left of the rocker 31, the pilot lamp 15 is received in a mounting opening not shown in greater detail in the drawing, electrical energy being supplied thereto by the first lead 16 and the second lead 17 when the switch 10 is in the ON position. The first lead 16 is connected to the contact lug 45 which in turn establishes the connection to the first terminal 4 (in this connection, see also FIG. 3). The second lead 17 (FIGS. 3, 4 and 5) is connected to the contact terminal 28 while at the same time being connected, through the connecting line 48, to the contact terminal 44 which is in contact with the first contact surface 33 of the second switch 12. The first lead 16 is further connected to the first lead 19 of the second pilot lamp 18 through the electric conductor 3.

With the exception of the connecting lines and the additional contact 24 integrally mounted with its fastening in the second switch 12, the two switches 10, 12 are identical, so that the mode of function and the configuration of the rocker 31 and its mounting arrangement will only be explained with reference to the second switch 12.

According to FIGS. 4 and 5, the contact terminal 46 establishes the connection to the electric conductor 3 and thus to the first terminal 4. The first and second switch 10 and 12, respectively, being connected to each other through the electric conductor 3 (FIGS. 3 and 4), one of the two contact terminals 45 or 46 may be omitted for reasons of economy. On the other hand, this would result in different switches in the terminal area which does not necessarily mean that savings can be realized where large production quantities are involved. The contact terminal 46 is connected to the second pilot lamp 18 through the first lead 19. The second lead 20 of the second pilot lamp 18 is connected to the additional contact 24 which, as clearly shown in FIGS. 4 and 5, is secured in a bore 27 of the plug member 26 which in turn is engaged in an opening 25 provided in the contact terminal 29. The plug member 26 is compressed in its opening 25 such that the wall of the bore 27 is in frictional engagement with the surface of the contact spring 24, causing it to be firmly connected to the contact terminal 29.

The free end 49 of the contact spring 24 extends into the range of motion B of the contact member 23. The end of the shank 51 of the actuating rocker (not shown in the drawing) of the second switch 12 bears against the bent free end 50 of the contact member 23. The actuating rocker includes a recess, likewise not shown, which is closed by a preferably colored transparent window. Below this window is the second pilot lamp 18, so that with the switch 12 in the ON position the light of the second pilot lamp 18 shines through the window, thus providing an indication to an operator on whether the switch is ON or OFF.

In FIG. 5, the OFF position I of the second switch 12 is shown by the lines, drawn in full, of the shank 51, the contact member 23 and the contact spring 24. The ON position II is illustrated by the broken lines of the shank 51, the contact member 23 and the contact spring 24. Accordingly, when the second switch 12 is moved from its OFF position I to its ON position II by a swivelling motion of the shank 51, the contact member 23 will turn clockwise about its bearing point 32 on the contact terminal 29, until the contact surface 34 rests on the first contact surface 33 of the second switch 12, whereby an electrical connection to the contact terminal 44 is established through the strut member 52. Prior to this, however, the free end 49 of the contact spring 24 contacts the underside 53 of the contact member 23, so that a connection between the contact member 23 and the second lead 20 of the second pilot lamp 18 is already established prior to the relative contact of the contact surfaces 33, 34.

The guide struts 54 formed on the sides of the switches 10, 12 serve for fastening, guiding and as abutment stop in a recess of a housing of a coffee maker provided for this purpose.

I claim:

1. A beverage brewer comprising an electrically operated flow-through heater, a heating resistor thermally coupled to said heater, said heating resistor having first and second leads, an electric conductor directly connecting said first lead of said heating resistor to a first power source terminal, a main conductor, a secondary conductor, said second lead of said heating resistor being adapted to be connected to a second power source terminal by either said main conductor or said secondary conductor, said secondary conductor including a switching element for reducing the heating power of said heating resistor, a first switch for connecting said second power source terminal to said main conductor, a second switch for connecting said second power source terminal to said secondary conductor, a first pilot lamp having a first lead connected to said electric conductor and a second lead adapted to be connected to said second power source terminal by closing of said first switch, a second pilot lamp having first and second leads, said second lead of said first pilot lamp being dead-ended in the open condition of said first switch and not connected to said main conductor until said first switch is closed, and said first lead of said second pilot lamp being connected to said electric conductor and said second lead of said second pilot lamp being dead-ended with said second switch in the open position, and not connected to said secondary conductor until said second switch is closed.

2. The beverage brewer of claim 1 wherein said second switch has first and second contact surfaces, and an additional contact which is electrically connected to said second lead of said second pilot lamp, said additional contact as said second switch closes being connected to said secondary conductor before contact is established between said first and second contact surfaces.

3. The beverage brewer of claim 2 wherein said secondary conductor is connected to said second contact surface and said second power source terminal is connected to said first contact surface of said second switch, said contact surfaces being adapted to be connected by movement of an electrically conducting contact member, and said additional contact is comprised of a contact spring fixedly located in the housing of said second switch and extending into the range of motion of said contact member, said spring resiliently engaging said contact member on movement of said contact member in the closing direction of said second switch before said contact member establishes contact between said first and said second contact surfaces.

4. The beverage brewer of claim 3 wherein said second switch has a contact terminal electrically connected to said second lead of the second lamp, said contact terminal of said second switch has an opening, an electrically insulating, rubber-elastic plug member is mounted in said opening, and said plug member includes a bore in which said contact spring is held by frictional engagement therewith.

5. The beverage brewer of claim 4 wherein said second switch is a rocker switch.

6. The beverage brewer of claim 1 wherein said first switch, in addition to having first and second contact surfaces, includes an additional contact which is electrically connected to said second lead of said first pilot lamp and which, as it closes, is connected to said main conductor before contact is established between said two contact surfaces.

7. The beverage brewer of claim 1 wherein said first switch has a contact terminal electrically connected to said second lead of the first lamp, said contact terminal of said first switch has an opening, an electrically insulating, rubber-elastic plug member is mounted in said opening, and said plug member includes a bore in which a contact spring is held by frictional engagement therewith, said spring resiliently engaging said contact member on movement of said contact member in the closing direction of said first switch before said contact member establishes contact between said first and said second contact surfaces.

8. The beverage brewer as claimed in claim 1 wherein said switching element is a diode, and said heating resistor delivers full heating power when first switch is closed and said second switch is open, while the delivered heating power is reduced when said second switch is closed and said first switch is open.

9. A beverage brewer comprising an electrically operated flow-through heater, a heating resistor thermally coupled to said heater, said heating resistor having a first lead directly connected to a first power source terminal via an electric conductor and a second lead adapted to be connected to a second power source terminal via a main conductor, a first switch, said main conductor including a regulator thermally coupled to said flow-through heater and adapted to heat up after completion of a brewing cycle such as to interrupt the supply of power from said main conductor to said heating resistor for a period of time dependent on the cooling off of said flow-through heater and its thermal coupling to said regulator, a secondary conductor connected in parallel with said main conductor, said secondary conductor including a serially connected second switch and a supplemental electrical heating device thermally coupled to said regulator, the resistance of said supplemental device being substantially greater than that of said heating resistor, a first pilot lamp having a first lead connected to the said electric conductor and a second lead adapted to be connected to said second power source terminal by closing of said first switch, and a second pilot lamp having first and second leads, said first lead of said second pilot lamp connected to said electric conductor, and said second lead of said second pilot lamp being dead-ended when said second switch is open and connected to said secondary conductor when second switch is closed.

10. The beverage brewer of claim 9 wherein said second switch has first and second contact surfaces, and an additional contact which is electrically connected to said second lead of said second pilot lamp, said additional contact as said second switch closes being connected to said secondary conductor before contact is established between said first and second contact surfaces.

11. The beverage brewer of claim 10 wherein said second switch is a rocker switch has a contact terminal electrically connected to said second lead, said contact terminal of said second switch has an opening, an electrically insulating, rubber-elastic plug member is mounted in said opening, and said plug member includes a bore in which a contact spring is held by frictional engagement therewith, said spring resiliently engaging said contact member on movement of said contact member in the closing direction of said second switch before said contact member establishes contact between said first and said second contact surfaces.

12. The beverage brewer of either claim 1 or claim 9 wherein said pilot lamps are glow lamps or light-emitting diodes.

* * * * *